United States Patent Office 3,702,764
Patented Nov. 14, 1972

3,702,764
CHLORINE AND IODINE CONTAINING POLY-9-VINYLCARBAZOLE ELECTROPHOTOGRAPHIC POLYMER
Kikuo Kinjo, Tokyo, Teruo Yamanouchi, Fujisawa, and Eiichi Kondo, Hiroshi Matsuno, and Katsuhiko Nishide, Tokyo, Japan, assignors to Canon Kabushiki Kaisha, Tokyo, Japan
No Drawing. Filed July 15, 1970, Ser. No. 55,216
Claims priority, application Japan, July 18, 1969, 44/56,806
Int. Cl. G03g 5/00
U.S. Cl. 96—1.5    16 Claims

ABSTRACT OF THE DISCLOSURE

An electrophotographic photosensitive material comprises a polymer containing a chlorine and iodine substituted vinylcarbazole unit.

This invention relates to an electrophotographic photosensitive material. Heretofore, there have been known various organic electrophotographic photosensitive materials. Some of them have a fairly high photosensitivity. However, organic photoconductive materials are seldom used practically as electrophotographic photosensitive material. Organic photoconductive materials have various excellent properties as compared with inorganic photoconductive materials. For example it is possible only by using organic photoconductive materials to produce a transparent and flexible photosensitive film of light weight and easy handling. Further, organic photoconductive materials are excellent in points of film shapability, surface smoothness, selectivity of charging polarity when applied to electrophotographic reproduction process. In spite of such various advantages of organic photoconductive materials, organic photoconductive materials have not contributed to electrophotographic art since the photosensitivity is low. For example, the photosenstivity is far lower than that of selenium and zinc oxide.

An object of this invention is to provide an organic electrophotographic photosensitive material of high sensitivity to increase commercial value of electrophotographic photosensitive materials.

Another object of this invention is to provide a process for producing a novel organic photoconductive material.

A further object of this invention is to provide a stable organic photoconductive material free from deterioration of photosenstivity upon long storage.

A still another object of this invention is to provide an organic photoconductive material of easy handling upon production.

A still further object of this invention is to provide an organic electrophotographic photosensitive material capable of being sensitized to a pohtosensitivity as high as or higher than that of inorganic electrophotographic photosensitive material.

According to this invention, the electrophotographic photosensitive material comprises a polymer (homopolymer and copolymer) containing a chlorine and iodine substituted 9-vinylcarbazole unit.

In this invention, "polymer containing a chlorine and iodine substituted 9-vinylcarbazole unit" includes a polymer containing both a chlorine substituted 9-vinylcarbazole unit and an iodine substituted 9-vinylcarbazole unit, a polymer containing both a chlorine and iodine substituted 9-vinylcarbazole unit and a chlorine or iodine substituted 9-vinylcarbazole unit, and a polymer containing a chlorine and iodine substituted 9-vinylcarbazole unit, a chlorine substituted 9-vinylcarbazole unit and a iodine substituted 9-vinylcarbazole unit as well as a polymer containing only a chlorine and iodine substituted 9-vinylcarbazole unit as a halogenated 9-vinylcarbazole unit.

The polymer containing a chlorine and iodine substituted 9-vinylcarbazole unit may be prepared by iodinating a chlorine substituted poly-9-vinylcarbazole or chlorinating an iodine substituted poly-9-vinylcarbazole. Furthermore, the polymer containing a chlorine and iodine substtiuted vinylcarbazole unit may be prepared by polymerizing a chlorine and iodine substituted 9-vinylcarbazole or copolymerizing a chlorine and iodine substituted 9-vinylcarbazole with other monomer. As the chlorine and iodine substituted 9-vinylcarbazole monomer, there may be mentioned 1-chloro-3-iodo-9-vinylcarbazole, 6-chloro-3 - iodo-9-vinylcarbazole, 1,6-dichloro-3-iodo-9-vinylcarbazole, and 1,3 - dichloro-6-iodo-9-vinylcarbazole. The degree of chlorination and bromination may be widely varied in the process of synthesis.

The electrophotographic characteristics can be varied by varying the degree of chlorination and iodination. In general, when degree of chlorination is higher than degree of iodination, there is obtained a better photosensitive material.

The electrophotographic photosensitive material according to this invention has advantageously high photosensitivity and gives only a small remaining potential upon exposure.

Preparation of the polymer of this invention is shown below.

PREPARATION EXAMPLE 1

Five grams of chlorine substituted poly-9-vinylcarbazole (chlorine content, 6.4%) soluble in methylene chloride and obtained by treating poly-9-vinylcarbazole (Luvican M-170, trade name, supplied by Badische Anilin und Soda Fabrik) with 0.4 mole of sulfuryl chloride in methylene chloride, was dissolved in 50 ml. of pyridine and was reacted with 2.7 g. of iodine with stirring at 110° C. for about 3 hours. The reaction mixture was then poured into a large amount of methanol to precipitate brown polymer. This brown polymer was dissolved in chlorobenzene and then precipitated in a methanol into which sulfur dioxide was blown. This precipitate was dissolved again in chlorobenzene and poured into methanol to obtain yellowish white polymer (I). This polymer (I) was easily soluble in chlorobenzene and total halogen content was 16.1%. Calculating from this value of total halogen content and original chlorine content, the iodine content was about 0.18 atom per vinylcarbazole unit.

Further, iodination in a pyridine solution may be effected according to a method described in Gazz. Chim. Ital,. vol. 26, No. 2 p. 238 reported by Mazzara.

PREPARATION EXAMPLE 2

The procedure in Preparation Example 1 above was repeated except that 3.0 g. and 5.0 g. of iodine were used and the reaction was effected for 10 hours. Thus, yellowish white polymers (II) and (III) were obtained respectively.

Properties of the polymers (II) and (III) are shown below.

Polymer (II):                                              Percent
  Total halogen content _____ 23.0
  Number of iodine atom per vinylcarbazole
    unit _____ 0.35
  Easily soluble in chlorobenzene and hardly soluble in benzene.
Polymer (III):
  Total halogen content _____ 24.4
  Number of iodine atom per vinylcarbazole
    unit _____ 0.38
  Easily soluble in chlorobenzene and hardly soluble in benzene.

With respect to these polymers, the absorption intensity at 870 cm.$^{-1}$ and 790 cm.$^{-1}$ in infrared spectrum is distinctly increased as compared with the original chlorine substituted polyvinylcarbazole Therefore, it is considered that the iodine mainly attached to the 3-position of carbazole ring.

PREPARATION EXAMPLE 3

Five grams of chlorine substituted poly-9-vinylcarbazole (chlorine content, 15.2%) soluble in methylene chloride and obtained by treating poly-9-vinylcarbazole (Luvican M–170, trade name, supplied by Badische Anilin und Soda Fabrik) with 1.05 mole of sulfuryl chloride in methylene chloride, was dissolved in 50 ml. of pyridine and was reacted with 3.0 g. of iodine at 110° C. for 3 hours with stirring.

Then, the resulting polymer (IV) was purified in a manner similar to Preparation Example 1. The polymer (IV) ocntains 19.7% total halogen, and the iodine content is 0.08 atom per vinylcarbazole unit.

PREPARATION EXAMPLE 4

Five grams of poly-9-vinylcarbazole (Luvican M–170, trade name, supplied by BASF) was dissolved in 50 ml. of pyridine and 6.6 g. of iodine was added thereto and heated at 110° C. for five hours with stirring. The reaction mixture was poured into a large amount of methanol to produce a brown polymer. The brown polymer was purified twice by precipitation purification in a tetrahydrofuran-methanol system to give 5.2 g. of white polymer. This white polymer was soluble in pyridine, monochlorobenzene and tetrahydrofuran. The analysis of the polymer shows that the iodine content is 22.6% and this corresponds to 0.45 atom per vinylcarbazole unit.

Five grams of this polymer was dissolved in 200 ml. of chlorobenzene and 1.65 g. of sulfuryl chloride was added thereto with stirring and the reaction was carried out for further 2 hours. The reaction mixture was poured into methanol and then dissolved in chlorobenzene again, followed by precipitation with methanol to yield about 5.2 g. of white polymer (V). Total halogen content was 28.4% Taking the iodine content of 0.45 atom per vinylcarbazole unit into consideration, the chlorine content is about 0.6 atom per vinylcarbazole unit.

This polymer is soluble in chlorobenzene and is not easily soluble in benzene. The infrared spectrum of this polymer is almost consistent with that of a polymer obtained in Preparation Example 5, 3-chloro-6-iodo-9- vinylcarbazole (VI).

PREPARATION EXAMPLE 5

6-iodocarbazole [M.P. 190° C., Tucker, J. Chem. Soc., p. 547 (1926)] was suspended in chloroform and one mole of sulfuryl chloride was added thereto at room temperature and refluxed. The reaction mixture was cooled to precipitate crystal. This crystal was reprecipitated by using glacial acetic acid to obtain 3-chloro-6-iodocarbazole, M.P. 220° C.

The resulting 3-chloro-6-iodocarbazole 4.0 g. powdered potassium hydroxide 0.07 g., and methylcyclohexane 5 ml. were placed in a 100 ml. autoclave and acetylene was introduced thereinto and reacted at 170° C. for 6 hours (initial pressure, about 25 atmospheric pressure, gauge). After cooling, the pressure was decreased to normal atmospheric pressure and the contents were poured into water and the resulting precipitate was filtered and recrystallized from n-hexane to obtain 2.8 g. of 3-chloro-6-iodo-9-vinylcarbazole, M.P. 160° C.

The resulting 3-chloro-6-iodo-9-vinylcarbazole 1.0 g. and acetonitrile 3.0 ml. were placed in a hard glass polymerization tube and irradiated with a high pressure mercury lamp. After gellation, the irradiation was continued further for 30 minutes and then methanol was added to precipitate the polymer followed by dissolving the precipitated polymer in benzene again and then precipitating with methanol. This procedure was repeated twice. Thus, a yellowish white polymer (VI), poly-3-chloro-6-iodo-9-vinylcarbazole, was obtained in an amount of 0.51 g. and in yield of about 50%. The intrinsic viscosity ($\eta$) in benzene was 0.60.

The above-mentioned 3-chloro-6-iodo-9-vinylcarbazole 0.5 g. and 9-vinylcarbazole 1.0 g. were placed in a polymerization tube, evacuated with nitrogen and heated at 120° C. After 8 hours, the contents were dissolved in chlorobenzene and precipitated with methanol. This procedure was repeated once to produce 0.7 g. of a white polymer (VII) in yield of 46%. Calculating from result of analysis, this polymer (VIII) contains chloroiodovinyl carbazole unit and vinylcarbazole unit in molar ratio of 0.5 to 3.0.

Further, the above-mentioned 3-chloro-6-iodo-9-vinylcarbazole 3.0 g. and styrene 0.5 g. were dissolved in 15 ml. of methylene chloride and boron trifluoride etherate was added thereto at —30° C. with vigorous stirring. Methanol was added to precipitate the product and the precipitate was recovered by filtration, dissolved in benzene and precipitated by methanol. This procedure was repeated twice to yield 2.0 g. of a white polymer (VIII). Calculating from the result of elementary analysis, this polymer (VIII) is regarded as a copolymer of 3-chloro-6-iodo-9-vinylcarbazole and styrene in a molar ratio of the units of about 7.5 to 2.2.

When the starting material is poly-9-vinylcarbazole, a polymer containing about 0.05 to 0.5 atom of iodine per vinylcarbazole unit is easily prepared.

Manufacturing electrophotographic photosensitive materials from the chlorine and iodine substituted polyvinylcarbazole may be carried out by applying the polymer solution to an electroconductive support followed by drying, or applying the molten polymer to said support, or forming a self-supporting polymer film by evaporation of solvent from a polymer solution or extrusion.

The above-mentioned polymer may be used in a form of self-supporting material such as thin film or textile, or in a form of a thin layer on an electroconductive support for electrophotosensitive material. For example, the polymer solution may be applied to a glass plate followed by peeling the coating after drying to obtain a self-supporting film, or the polymer melt is extruded to form fibers followed by weaving them, or the polymer solution is coated on an electroconductive support. To the polymer may be added an additive for adjusting photographic property such as sensitizer and an additive for adjusting physical property of film such as plasticizer and opaque-imparting agent.

As sensitizers, there may be mentioned Lewis acids, for example, polynitro compounds such as 1,3,5-trinitrobenzene, picric acid, 5-nitroacenaphthene and 2,4,7-trinitrofluorenone, carboxylic acids such as acetic acid, trifluoroacetic acid, trichloroacetic acid and salicylic acid, sulfonic acid such as benzene sulfonic acid and p-toluene sulfonic acid, sulfonic acid chloride such as p-toluene sulfonyl chloride, and optical sensitizer such as Crystal Violet, Malachite Green, Methylene Blue, Brilliant Green, Methylene Blue, Quinizaline.

As plasticizers, there may be mentioned dibutylphthalate, dioctylphthalate, tricresylphosphate and polyphenyl chloride.

Further, it has been found that a free radical sensitization by free radical former is very effective to the polymer of this invention. With respect to the free radical sensitizing method, Japanese patent application Nos. 68,671/1968 and 68,533/1968 disclose that a remarkably sensitized electrophotographic photosensitive plate can be prepared by applying a radiation energy to a photoconductive compound in the presence of a free radical former and, if necessary, in the presence of aromatic amine or leuco form of coloring matter. When polymer of this invention is used as the photoconductive compound, a very useful electrophotographic photosensitive plate can be produced.

As free radical formers particularly effective for the polymer containing a chlorine and iodine substituted 9-vinylcarbazole unit of this invention, there may be mentioned polyhalogen compounds such as iodoform, carbon tetrabromide, bromoform, bromotrichloromethane and hexachloroethane.

As aromatic amines, there may be mentioned 9-vinylcarbazole, 3-chloro-9-vinylcarbazole, diphenylamine, and triphenylamine.

As leuco form of coloring matters, there may be mentioned leuco Malachite Green and leuco Crystal Violet.

A solution of these components in benzene or monochlorobenzene is irradiated with a high pressure mercury lamp to cause a reaction and then coated on a support such as aluminum plate, paper and film followed by drying to form a photosensitive plate.

If desired, the free radical sensitizing method may be used together with conventional optical sensitization and Lewis acid sensitization.

The radiation energy source may be appropriately selected depending upon free radical former and solvent used. Any source may be used which can produce a free radical from the free radical former in the sensitizing treatment system. For example, a light source capable of emitting a large amount of ultraviolet ray such as mercury lamp (low pressure, high pressure, and super high pressure), metal halide lamp and xenon lamp, is preferred.

Amount of free radical former preferably ranges from one to 30% by weight on the basis of polymer, but not restricted to said range.

The electrophotographic photosensitive material according to this invention can be used for producing images by using conventional charging and developing means such as corona discharging, magnet brush development, and electrophoresis development.

As mentioned above, the polymer containing a chlorine and iodine substituted 9-vinylcarbazole unit can be effectively sensitized by coloring matter sensitization, Lewis acid sensitization and free radical sensitization, and furthermore, residual potential is very low in an electrophotographic reproduction process to give always clear images.

The following examples are given for the purpose of illustration and not by way of limitation.

EXAMPLE 1

A rough surface of an aluminum plate was defatted with a mixture of ether and alcohol and coated with the polymer solution to form a film of 8 microns in thickness by using a rotary coating machine followed by drying with warm air blowing.

The polymer solution was a solution of 2 g. of the chlorine substituted poly-9-vinylcarbazole containing 6.4% chlorine in Preparation Example 1 above, the chlorine substituted poly-9-vinylcarbazole containing 15.2% chlorine in Preparation Example 3, or each of polymers (1) to (IV) prepared in Preparation Examples, in 40 ml. of chlorobenzene.

The resulting photosensitive plate was negatively charged by using a rotary electrometer, exposed to a 100 w. high pressure mercury lamp, and the irradiation times required for decreasing the potential to ⅓ and ¹⁄₁₀ were used as the degree of residual potential for comparison of photosensitivity. The initial potential when the irradiation starts was about 500 volts for each sample. The comparison was made by assuming the value of chlorine substituted poly-9-vinylcarbazole of 6.4% chlorine content and that of chlorine substituted poly-9-vinylcarbazole of 15.2% chlorine content as 100. The comparison results are shown below.

| Sample polymer | Exposure time required for decreasing to ⅓ | Exposure time required for decreasing to ¹⁄₁₀ |
|---|---|---|
| Polymer (I) | 95 | 34 |
| Polymer (II) | 81 | 40 |
| Polymer (III) | 82 | 40 |
| Chlorine substituted poly-9-vinylcarbazole containing 6.4% chlorine | 100 | 100 |
| Polymer (IV) | 98 | 30 |
| Chlorine substituted poly-9-vinylcarbazole containing 15.2% chlorine | 100 | 100 |

EXAMPLE 2

To a polyethyleneterephthalate film of 90 microns in thickness was applied a solution of 4 g. of cuprous iodide in 150 ml. of acetonitrile to which 30 ml. of a 5% solution of polyvinylformal, and dried to impart electroconductivity to the film surface. Then, the surface was coated with a solution having the following composition to form a film of 4 microns in thickness after drying.

Polymer (VI) obtained in Preparation Example 5 _____ g__ 2.0
Chlorobenzene _____ ml__ 40
Diphenylamine blue _____ mg__ 5

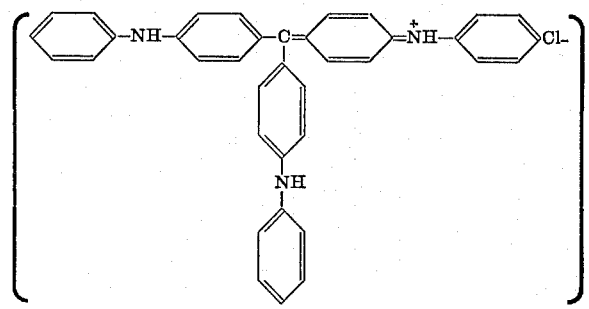

2,4,7-trinitrofluorenone _____ mg__ 2
Diphenyl chloride _____ g__ 0.2

The resulting film was negatively charged in a dark place by using a corona charging device and exposed to a positive microfilm original by using a photographic enlarger equipped with 500 w. tungsten lamp. The exposed film was developed by soaking in a high boiling point petroleum solvent in which carbon black is dispersed and thereby a clear positive image was obtained. The optimal exposure amount in this case was 230 lux. sec..

With respect to a photosensitive plate made from polymer (VIII), a good image was obtained by using an exposure amount twice that required in the above case.

EXAMPLE 3

Two grams of polymer (VII) obtained in Preparation Example 5 above was dissolved in 40 ml. of chlorobenzene, and 100 mg. of carbon tetrabromide was added thereto.

The resulting solution was placed in a hard glass flask and exposed to a 100 w. high pressure mercury lamp at a distance of 10 cm. with stirring.

After 20 minutes, 1.0 mg. of 2,4,7-trinitrofluorenone and 1.0 mg. of Crystal Violet were added to this solution and the resulting solution was applied to a polyethyleneterephthalate film having an electroconductive layer of Example 2 and dried. The film thus obtained gives good image at an exposure amount of about 120 lux. sec. by negative charging and positive electrophoresis development and at an exposure amount of about 100 lux. sec. by positive charging and positive electrophoresis development.

When bromoform, iodoform, and bromotrichloromethane are used in place of carbon tetrabromide, similar results were obtained.

EXAMPLE 4

Two grams of polymer (V) prepared in Preparation Example 4 was dissolved in 35 ml.. of chlorobenzene, and 200 mg. of 2,4,7-trinitrofluorenone was added thereto. The resulting solution was applied to a rough surface of an aluminum drum to form a film of 20 microns in thickness (after dried). The photosensitive drum can be used for forming clear images by a process comprising charging, exposing, developing and transferring.

In a similar manner, the solution of the above composition was applied to a surface of an aluminum drum to form a film of 70 microns in thickness (after dried) and further a polyethyleneterephthalate film of 20 microns in thickness was adhered thereonto. The resulting laminating type photosensitive drum can be used for forming images by various electrophotographic process.

What is claimed is:

1. An electrophotographic photosensitive material which comprises a polymer containing a chlorine and iodine substituted 9-vinylcarbazole unit.

2. An electrophotographic photosensitive material according to claim 1 in which the polymer is that obtained by applying both chlorination and iodination to poly-9-vinylcarbazole.

3. An electrophotographic photosensitive material according to claim 2 in which the iodine content ranges from 0.05 to 0.5 atom per 9-vinylcarbazole unit.

4. An electrophotographic photosensitive material according to claim 1 in which the polymer is that obtained by polymerizing a chlorine and iodine substituted 9-vinylcarbazole.

5. An electrophotographic photosensitive material according to claim 4 in which the chlorine and iodine substituted 9-vinylcarbazole is at least one of monochloro-monoiodo 9-vinylcarbazole and dichloro-monoiodo 9-vinylcarbazole.

6. An electrophotographic photosensitive material according to claim 5 in which the monochloro-monoiodo 9-vinylcarbazole is 3-chloro-6-iodo-9-vinylcarbazole.

7. An electrophotographic photosensitive material according to claim 1 in which the polymer is a copolymer of a chlorine and iodine substituted 9-vinylcarbazole with a vinyl monomer selected from 9-vinylcarbazole and styrene.

8. An electrophotographic photosensitive material according to claim 7 in which the vinyl monomer is 9-vinylcarbazole.

9. An electrophotographic photosensitive material according to claim 7 in which the vinyl monomer is styrene.

10. An electrophotographic photosensitive material according to claim 7 in which the vinyl monomer is a combination of styrene and 9-vinylcarbazole.

11. An electrophotographic photosensitive material according to claim 1 in which a sensitizer is added to the polymer.

12. An electrophotographic photosensitive material according to claim 11 in which the sensitizing agent is a sensitizing dye.

13. An electrophotographic photosensitive material according to claim 11 in which the sensitizing agent is a Lewis acid.

14. An electrophotographic photosensitive material according to claim 11 in which the sensitizing agent is a combination of a sensitizing dye and a Lewis acid.

15. An electrophotographic photosensitive material which comprises a polymer containing a chlorine and iodine substituted 9-vinylcarbazole unit subjected to a photochemical reaction treatment by applying a radiation energy in the presence of a free radical former capable of producing a free radical when irradiated by a radiation energy.

16. An electrophotographic photosensitive material according to claim 15 in which a sensitizer is added thereto.

References Cited

UNITED STATES PATENTS

| 3,484,237 | 12/1969 | Shattuck et al. | 96—1.5 |
| 3,287,123 | 11/1966 | Hoegl et al. | 96—1.5 |
| 3,421,891 | 1/1969 | Inami et al. | 96—1.5 |

FOREIGN PATENTS

| 43/7,591 | 3/1968 | Japan | 96—1.5 |

GEORGE F. LESMES, Primary Examiner

M. B. WITTENBERG, Assistant Examiner

U.S. Cl. X.R.

252—501; 260—80.3 R; 88.3 R